United States Patent Office 3,301,536
Patented Jan. 31, 1967

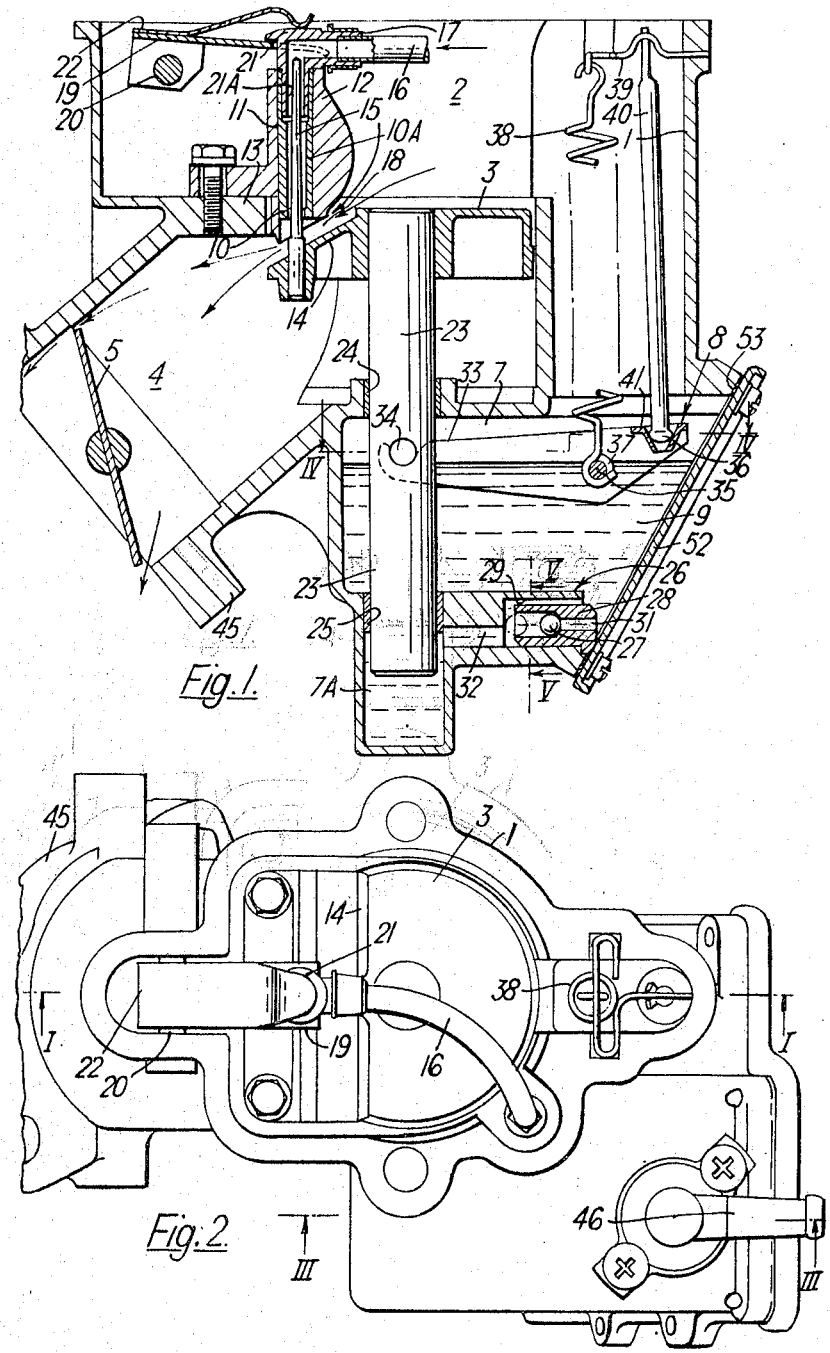

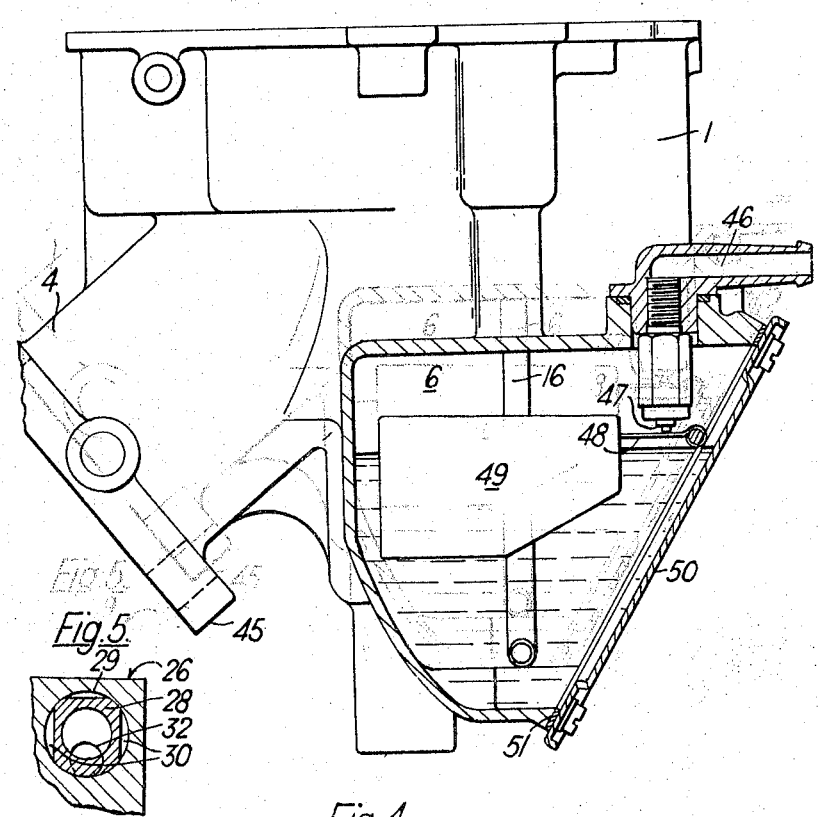
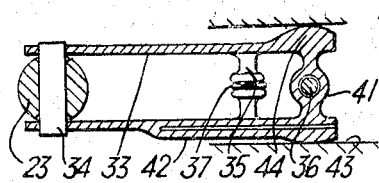

3,301,536
CARBURETTERS FOR INTERNAL COMBUSTION ENGINES
Peter P. Swatman, Olton, and John N. Morris, Edgbaston, England, assignors to S. U. Carburetter Company Limited, Erdington, England
Filed May 24, 1965, Ser. No. 458,274
Claims priority, application Great Britain, June 19, 1964, 25,369/64
6 Claims. (Cl. 261—44)

This invention relates to carburetters for internal combustion engines, of the controllable jet, variable-choke type having a fuel-metering jet controlled by a contoured metering needle in dependence upon the instantaneous position of a suction-operated piston that controls the effective cross-sectional area of a choke in the main air passage of the carburetter.

The object of the invention is to make is possible for carburetters of the type specified above to be manufactured much more cheaply, by simplification of their design. To this end, according to the invention, the metering needle is mounted on, and near to the periphery of, the head of the suction-operated piston, the piston head being situated in the main air passage and constituting a boundary of the variable choke; the fuel-metering jet is supported on the body of the carburetter by mounting means effective to engender accurate concentricity of the jet and the needle; a mixture supply duct, fitted with a throttle valve, debouches from the main air passage in such a manner that it becomes progressively uncovered by the piston as the latter moves in response to an increase in air flow; and the aerodynamic load on the piston is opposed by a spring-load which is applied through a variable leverage mechanism so arranged that the load exerted by it on the piston diminishes as the piston responds to increased air flow. This diminishing load characteristic of the variable leverage mechanism counteracts the decreasing aerodynamic load on the piston, which otherwise would be subjected to an increasing load in the choke-closing direction as it moved in response to increasing air flow. In this way, it is ensured that there is a controlled, and substantially constant, pressure-drop through the choke.

In the preferred embodiment of the invention the above-mentioned variable leverage mechanism comprises a lever having three pivots disposed in a triangular manner; of which the inner pivot is subjected to the spring-load, and the outer pivots are located respectively on a member rigid with the piston and on a pivotal rigid member attached to the body of the carburetter.

Referring to the accompanying drawings:

FIGURE 1 is a sectional elevation of a carburetter constructed in accordance with the invention, the section being on the line I—I in FIGURE 2;

FIGURE 2 is a plan view of the carburetter;

FIGURE 3 is an elevation of the carburetter, partly in section on the line III—III in FIGURE 2;

FIGURE 4 is a fragmentary sectional plan view on the line IV—IV in FIGURE 2; and FIGURE 5 is an enlarged section on the line V—V in FIGURE 1.

The body 1 of the improved carburetter can conveniently be made of one main metal casting or plastic moulding. Its upper portion has a main bore 2, affording an air intake passage, in which a suction-operated piston 3 is slidable, and also has a mixture supply duct 4 fitted with a throttle valve 5. The body 1 contains two separate chambers, one being a float chamber 6 (FIG. 3) and the other chamber 7 (FIG. 1) housing a variable leverage mechanism 8 and, in addition, containing oil 9 or other liquid for the purpose of damping the movements of the piston 3.

In the specific example of construction illustrated, a fuel-metering jet 10 (FIG. 1) is located at the base of a tube 10A slidable in a bore 11 formed in a block 12 which is adjustably mounted on a rigid platform 13 situated in the air intake passage 2. The face of the block 12 that is exposed to the air flow has a venturi-like shape, and overlies an obliquely truncated portion 14 of the head of the piston 3. A metering needle 15 projects upwardly through the jet 10, from a location near to the periphery of the truncated portion 14 of the piston head.

A pipe 16, submerged at one end in the float chamber 6, is connected to an inlet 17 on the jet block 12. Consequently, in operation, fuel is drawn from the float chamber 6, and delivered to the jet 10, by the suction created by the air flow through a choke 18 which is close to the jet. Provision is made for shifting the jet tube 10A axially to effect idling adjustment, and for raising it well above the idling setting in order to afford cold-starting and warming-up enrichment. These adjustments are effected by a lever 19 pivoted at 20, and forked to engage the underside of a flanged head 21 on the jet assembly. A cantilever blade spring 22 maintains the jet head 21 in contact with the lever 19 at all times. The jet head 21 has a depending cylindrical part 21A which has a press fit in the slidable jet tube 10A.

The piston 3 has a rod 23 that is slidably mounted in two axially aligned guide bushes 24 and 25. The lower end of the piston rod 23 acts as a plunger, having peripheral clearance, within a small oil-filled chamber 7A, which forms an extension of the chamber 7, and the rate of flow of oil into and out of the chamber 7A is controlled by a damper valve assembly 26 designed to perform two functions. The first of these is to suppress rapid oscillations of the piston 3 induced by pulsating air flow demands of the engine. The second is to impose a greater restriction upon larger movements of the piston 3, such as occur when the throttle 5 is opened suddenly, and thus to increase the fuel/air ratio under these transient conditions.

The double-acting damper valve assembly 26 comprises a ball-valve 27 contained in an open-ended housing 28 which is located in a cylindrical bore 29. As can be seen from FIGURE 5, the external shape of the housing 28 is such that, although its lower part fits the bore 29, it presents three flat sides; so that fluid can flow through the gaps between it and the bore 29, these gaps constituting external ports 30 of fixed area and permanently open. An internal port 31 is controlled by the ball-valve 27 (which, incidentally, could be replaced by a disc valve or a poppet valve, if desired).

When the piston 3 moves downwardly, some oil is expelled from the chamber 7A by the piston rod 23, and flows through a duct 32 and the external ports 30 into the reservoir 7; the flow of oil causing the ball-valve 27 to seal the internal port 31. In this case the damping effect is controlled by the combined areas of the external ports 30.

When the piston 3 moves upwardly, oil flows from the reservoir 7 through the ports 30 and 31, and the duct 32, into the chamber 7A; the flow of oil causing the ball-valve 27 to move into the position indicated in dotted lines. In this case the damping effect is controlled by the total area of the external ports 30 and also by the restrictive effect of the ball-valve 27 upon the flow through the internal port 31.

When the setting of the throttle 5 is either steady or is being changed gradually, the piston 3 is subjected to pneumatic pulsations which vary with the degree of throttle opening and with the engine speed. The damper valve assembly 26 is effective to suppress oscillation of the piston 3 in response to those pulsations; the ball-valve 27 having a limited travel (this being a function of the relative cross-sectional areas of the piston rod 23 and of the ball-valve clearance) which affords damping by way of the ports 30 and 31.

The variable leverage mechanism 8, mentioned earlier, comprises a lever 33 of duplex construction (i.e. simulating approximately an elongated U-shaped in plan view) which has three pivots 34, 35 and 36 (FIGS. 1 and 4) disposed in a triangular manner. One outer pivot 34 is located on the piston rod 23, this rod being embraced by the two limbs of the lever 33, which are notched to engage under a transverse pin 34 projecting at opposite sides of the rod 23. The inner pivot 35 is constituted by a transverse pin 35 that interconnects the two limbs of the lever 33, this pin being engaged by a hook 37 on the lower end of a vertically disposed helical tension spring 38 the upper end of which is attached to a bracket 39 fixed near the mouth of the air intake 2. The other outer pivot 36 is afforded by the lower end of a pivotal rigid strut 40 which seats in a bearing cup 41 at the end of the lever 33 remote from the piston rod 23; the upper end of the strut 40 being attached to the bracket 39. The arrangement is such that, with progressive downward movement of the piston 3, the inner pivot 35 of the lever 33 and the outer pivot 36 afforded by the strut 40 become more nearly collinear with respect to the upper attachment point of the spring 38.

The variable leverage mechanism 8 is also designed so that it affords precise rotational indexing of the piston head 3. This is achieved by having zero clearance in the bearing pick-up at 34 between the lever 33 and the piston rod 23, and effecting precise location of the other end of the lever by spring-loading the face of one limb of the lever, for example, by means of a resilient blade 42 (FIG. 4) integral with that limb, to ensure zero clearance in a location slot 43. The limbs of the lever are formed with rounded projections 44 that contact the respective sides of the location slot 43.

The carburetter has the usual mounting flange 45 on the mixture supply duct 4. The float chamber 6 is fitted with a fuel inlet 46 (FIG. 3) controlled, as usual, by a needle valve 47 which is actuated by the pivotal arm 48 of the float 49. Access to the float chamber is afforded by a detachable cover 50, fitted with a liquid-tight gasket 51. Similarly, the chamber 7 has a detachable cover 52 fitted with a liquid-tight gasket 53.

The particular embodiment illustrated in the drawings may be modified in various respects. For example, the head of the piston 3 may have a different shape from that described, depending upon the disposition of the mixture supply duct 4 and especially upon the angle at which it debouches from the main air passage 2. The piston 3 could even be flat-topped, but it is desirable that the shape of the top of the piston head should be such as to guide the air flow into the mixture supply duct 4 with minimum losses. The above-mentioned obliquely truncated portion 14 of the piston head represents one way of achieving that in the case of a particular disposition of the mixture supply duct 4, but the latter might be arranged to embrace the full circumference of the piston 3, and, in this case, it might be desirable for the piston head to be of conical shape.

Again, although it is more convenient constructionally to have the float chamber 6 in the lower portion of the carburetter body 1, it could be located alongside the metering jet 10. In that event delivery of the fuel to the jet could be effected either by a tube or by employing a glanded jet.

We claim:

1. In a carburetter comprising a body housing a fuel metering jet, a main air inlet passage, and a mixture supply duct, a piston movable in said main air inlet passage, and a metering needle axially movable in said fuel metering jet, the improvement according to which said piston defines with a wall of said main air inlet passage a choke connecting said main air inlet passage to said mixture supply duct and communicating with said fuel metering jet to suck fuel therethrough into said choke, the effective cross-sectional area of said choke being dependent upon the position of said piston, and said metering needle being mounted on said piston for movement therewith, said carburetter further comprising a variable leverage mechanism which resists the force exerted on said piston by incoming air in said air inlet passage, by applying to said piston a load which automatically diminishes as said piston moves in response to the exertion of increasing force by said incoming air, and said variable leverage mechanism comprising a lever mounted to turn about three pivot points spaced longitudinally along said lever, spring means carried on said body and applying a load to said lever at a first one of said pivot points, and a rigid member rockably supported at one end by said body while its other end pivotally engages said lever at a second of said pivot points, said lever being positioned with said third pivot point operatively engaging said piston to transfer thereto the load applied to said lever by said spring in a proportion dependent upon the positions of said first and second pivot points relative to the point at which said spring is carried by said body, while said piston acts on said lever to adjust the positions of said first and second pivot points.

2. A carburetter as claimed in claim 1 in which the piston is hinged to said lever with zero clearance for relative movement in a single plane only, and said lever is constrained to swing within that plane by guide means carried by said body and provided with a locating slot which embraces with zero clearance the end of said lever remote from said piston.

3. A carburetter according to claim 2, in which said lever has rounded projections which contact the respective sides of the location slot, and one projection-carrying face of said lever is spring-loaded to ensure zero clearance in the location slot.

4. In a carburetter comprising a body housing a fuel metering jet, a main air inlet passage, and a mixture supply duct, a piston movable in said main air inlet passage, and a metering needle axially movable in said fuel metering jet, the improvement according to which said piston defines with a wall of said main air inlet passage a choke connecting said main air inlet passage to said mixture supply duct and communicating with said fuel metering jet to suck fuel therethrough into said choke, the effective cross-sectional area of said choke being dependent upon the position of said piston, and said metering needle being mounted on said piston for movement therewith, said carburetter further comprising a variable leverage mechanism which resists the force exerted on said piston by incoming air in said air inlet passage, by applying to said piston a load which automatically diminishes as said piston moves in response to the exertion of increasing force by said incoming air, together with a rigid platform positioned in said main air passage, and a block adjustably mounted on said platform, said block being provided with a bore, and said fuel-metering jet comprising a tube within said bore, the face of the block which is exposed to the air flow within said main air passage having a venturi-like shape and overlying a portion of the piston.

5. A carburetter according to claim 4, comprising means for shifting the jet tube axially to effect idling adjustment, and for raising it well above the idling setting in order to afford cold-starting and warming-up enrichment.

6. In a carburetter comprising a body housing a fuel metering jet, a main air inlet passage, and a mixture supply duct, a piston movable in said main air inlet passage, and a metering needle axially movable in said fuel metering jet, the improvement according to which said piston defines with a wall of said main air inlet passage a choke connecting said main air inlet passage to said mixture supply duct and communicating with said fuel metering jet to suck fuel therethrough into said choke, the effective cross-sectional area of said choke being dependent upon the position of said piston, and said metering needle being mounted on said piston for movement therewith, said carburetter further comprising a variable leverage mechanism which resists the force exerted on said piston by incoming air in said air inlet passage, by applying to said piston a load which automatically diminishes as said piston moves in response to the exertion of increasing force by said incoming air, and the body of the carburetter containing two separate chambers, one being a float chamber and the other housing the variable leverage mechanism and, in addition, containing a liquid for damping the movements of the piston, together with a liquid filled extension chamber, a rod carried by said piston which acts as a plunger in said extension chamber, and a double-acting damper valve assembly through which said extension chamber is connected to the chamber containing the variable leverage mechanism and the damping liquid, said damper valve assembly comprising a member having a valve-controlled internal port and also external ports which are of fixed area and which are permanently open.

References Cited by the Examiner

UNITED STATES PATENTS

| | | | |
|---|---|---|---|
| 2,099,553 | 11/1937 | Atkins | 261—50 |
| 2,789,801 | 4/1957 | Durbin. | |
| 2,939,776 | 6/1960 | McClain | 261—50 X |
| 3,015,548 | 1/1962 | McClain. | |
| 3,182,974 | 5/1965 | Hill | 261—50 X |
| 3,210,055 | 10/1965 | Kingsley | 261—50 X |

FOREIGN PATENTS

| | | |
|---|---|---|
| 11,368 of 1912 | 5/1913 | Great Britain. |

FRANK W. LUTTER, *Primary Examiner.*

HARRY B. THORNTON T. R. MILES,
*Assistant Examiners.*